(12) United States Patent
Abelenda Alcalde et al.

(10) Patent No.: US 11,370,379 B2
(45) Date of Patent: Jun. 28, 2022

(54) MOUNTING ELEMENT FOR VEHICLE-SIDE ASSEMBLY OF AN AIRBAG MODULE

(71) Applicant: Dalphi Metal Espana, S.A., Vigo (ES)

(72) Inventors: Maria del Pilar Abelenda Alcalde, Vigo (ES); Jose Manuel Arean Bujan, Vigo (ES); Pedro Jose Santin Navarro, Vigo (ES); Philippe Shneeweiss, Nigran (ES)

(73) Assignee: DALPHI METAL ESPANA S.A., Vigo (ES)

( * ) Notice: Subject to any disclaimer, the term of this patent is extended or adjusted under 35 U.S.C. 154(b) by 94 days.

(21) Appl. No.: 16/701,278

(22) Filed: Dec. 3, 2019

(65) Prior Publication Data

US 2020/0180541 A1 Jun. 11, 2020

(30) Foreign Application Priority Data

Dec. 7, 2018 (DE) .......................... 202018106999.3

(51) Int. Cl.
  B60R 21/21 (2011.01)
  B60R 21/231 (2011.01)
  (Continued)

(52) U.S. Cl.
  CPC .......... B60R 21/21 (2013.01); B60R 21/2176 (2013.01); B60R 21/232 (2013.01);
  (Continued)

(58) Field of Classification Search
  CPC ................ B60R 21/21; B60R 21/2176; B60R 21/23138; B60R 21/232; B60R 21/201;
  (Continued)

(56) References Cited

U.S. PATENT DOCUMENTS

| 6,279,941 | B1 * | 8/2001 | Nakajima | ............. | B60R 21/213 |
| | | | | | 280/728.2 |
| 7,320,477 | B2 * | 1/2008 | Kawabe | ................ | B60R 21/213 |
| | | | | | 280/728.2 |

(Continued)

FOREIGN PATENT DOCUMENTS

| DE | 102010008158 A1 * | 8/2011 | ............. B60R 21/20 |
| EP | 2112031 A1 * | 10/2009 | ........... B60R 21/213 |

(Continued)

OTHER PUBLICATIONS

Demel et al. EP 1721788 A1 Machine English Translation, ip.com (Year: 2006).*

*Primary Examiner* — Karen Beck
(74) *Attorney, Agent, or Firm* — Tarolli, Sundheim, Covell & Tummino LLP

(57) ABSTRACT

A mounting element (1) for vehicle-side assembly of an airbag module (100) is suggested with at least one mounting plate (3) adapted to be mounted on the vehicle side which in its plate plane (E) can be non-rotatably coupled to an airbag (2), wherein the mounting plate (3) includes an extension (4) through which the mounting element (1) can be fixed, perpendicularly to the plate plane (E), non-rotatably to the airbag (2) or to a retaining element (9) maintaining the latter in its folded state. Furthermore, an airbag module (100) is suggested with an airbag (2), an inflator for providing inflating gas for the airbag (2) and at least one mounting element (1) according to the invention. Furthermore, a vehicle occupant restraint system is suggested comprising the airbag module (100) as well as comprising at least one sensor unit for detecting circumstances which trigger a case of activation of the inflator and comprising an electronic computing unit for defining the case of activation based on the circumstances detected by the sensor unit.

21 Claims, 3 Drawing Sheets

(51) Int. Cl.
  *B60R 11/00*   (2006.01)
  *B60R 21/217*  (2011.01)
  *B60R 21/232*  (2011.01)

(52) U.S. Cl.
  CPC . *B60R 21/23138* (2013.01); *B60R 2011/0019* (2013.01); *B60R 2011/0059* (2013.01)

(58) Field of Classification Search
  CPC .................. B60R 21/213; B60R 21/20; B60R 2021/0059
  See application file for complete search history.

(56) References Cited

U.S. PATENT DOCUMENTS

| | | | |
|---|---|---|---|
| 7,780,187 B2 * | 8/2010 | Minamikawa | ........ B60R 21/201 |
| | | | 280/728.2 |
| 9,789,837 B2 * | 10/2017 | Ma | ....................... B60R 21/232 |
| 2003/0042712 A1 * | 3/2003 | Henderson | ............ B60R 21/213 |
| | | | 280/728.2 |
| 2004/0169357 A1 | 9/2004 | Fischer et al. | |
| 2005/0046154 A1 * | 3/2005 | Rhea | ..................... B60R 21/213 |
| | | | 280/728.2 |
| 2009/0184494 A1 * | 7/2009 | Dominissini | ......... B60R 21/217 |
| | | | 280/728.2 |
| 2016/0075300 A1 | 3/2016 | Tietze et al. | |
| 2016/0159308 A1 * | 6/2016 | Choi | ..................... B60R 21/201 |
| | | | 280/728.2 |
| 2018/0015901 A1 | 1/2018 | Konaka et al. | |
| 2019/0001912 A1 * | 1/2019 | Sato | ....................... B60R 21/213 |
| 2020/0086819 A1 * | 3/2020 | Landis | .................. B60R 21/213 |

FOREIGN PATENT DOCUMENTS

| | | | | |
|---|---|---|---|---|
| JP | 2017179875 | | 10/2017 | |
| WO | WO-2008025709 A1 | * | 3/2008 | ........... B60R 21/213 |
| WO | WO-2010066371 A | * | 6/2010 | ........... B60R 21/213 |

* cited by examiner

MOUNTING ELEMENT FOR VEHICLE-SIDE ASSEMBLY OF AN AIRBAG MODULE

RELATED APPLICATION

This application claims priority from German Application No. 20 2018 106 999.3, filed Dec. 7, 2018, the subject matter of which is incorporated herein by reference in its entirety.

BACKGROUND OF THE INVENTION

The present invention relates to a mounting element for mounting an airbag module to a vehicle. The invention further relates to an airbag module comprising said mounting element as well as to a vehicle occupant restraint system.

A vehicle occupant restraint system may comprise, as is known, an inflatable airbag such as e.g. a front or rear window airbag, or a side airbag which may be, for example, in the form of a thorax airbag and/or a curtain airbag and may comprise an inflator for inflating the airbag in the case of activation. Said airbags prevent the vehicle occupant from being injured in the shoulder and/or head area especially in the event of front, rear or side impact.

Usually the rolled-up or otherwise folded airbag is mounted through mounting portions e.g. to the vehicle body within the vehicle interior, in a curtain airbag especially above the window cutouts, so that in the case of activation the rolled-up or folded airbag may protectively spread e.g. ahead of the front, rear or side window cutouts. For vehicle-side mounting one or more mounting arrangements which mount the present retaining tabs of the airbag to the vehicle body are provided.

For example, from the document U.S. Pat. No. 6,279,941 B1 a head airbag module for being mounted to a vehicle body is known. The head airbag module comprises an inflatable airbag which is mounted along a lateral portion within the vehicle interior. To this end, it includes plural mounting portions. Each of the mounting portions is formed by a pair of mounting plates between which a respective retaining tab of the airbag is mounted on the vehicle side. The corresponding mounting plates are screwed to the vehicle body. The mounting plate facing the vehicle body includes locking elements projecting perpendicularly from the mounting plate which are received by the vehicle body so that rotation of the mounting plate is counteracted when screwing the latter on the vehicle side.

In the case of activation, it is imaginable at least theoretically that due to gas flowing into the airbag the latter will rotate, even before it expands downwards, in the circumferential direction about its longitudinal extension against its rolling or folding direction.

SUMMARY OF THE INVENTION

Therefore, the object underlying the present invention is to suggest a mounting element and an airbag module comprising said mounting element as well as a vehicle occupant restraint system by which undesired rotation of the rolled-up or folded airbag is counteracted.

Said object is achieved, according to the invention, with regard to a mounting element by the features of claim 1, with regard to an airbag module by the features of claim 8 and with regard to a vehicle occupant restraint system by the features of claim 10.

According to the invention, hence a mounting element for vehicle-side assembly of an airbag module is provided comprising at least one mounting plate adapted to be mounted on the vehicle side which can be coupled to an airbag non-rotatably in its plate plane.

The mounting plate includes an extension through which the mounting element can be fixed non-rotatably transversely to the plate plane on the airbag or on a retaining element maintaining the latter in its folded state.

In this way, a vehicle-side assembly of the airbag module via the mounting element according to the invention as a specifically designed mounting plate is enabled in which the rolled-up airbag is prevented from rotating especially in the circumferential direction. Accordingly, a determined exiting direction of the airbag is safeguarded so that in the case of activation the airbag is correctly positioning itself during inflation.

The extension is preferred to have at least one undercut which can be fixed on a recess of the airbag or the retaining element.

Thus, the extension may be caught in an easy-to-mount manner to the airbag and, resp., to a mounting tube or any other functional element of the airbag module without any detaching having to be feared in the case of release.

As the provided elongate extension is advantageously aligned at the mounting plate in the plate plane and can be fixed on the airbag side, especially on the mounting tube side, a torque occurring during inflation of the airbag is sufficiently supported via the extension. Accordingly, the concrete constructional design of the extension is possible in various ways, when the extension forms a sufficient lever arm with respect to the screw connection.

A design of the invention which is especially advantageous as to construction provides that the extension can be fixed in a recess or the like of a mounting tube or the like receiving the airbag. Fixation of the extension may be realized in various ways such as e.g. by positive, friction and/or non-positive locking. An especially easy-to-assemble design would be to provide undercuts or the like at an end portion of the extension.

In order to realize an especially mechanically stable configuration of the mounting plate the extension may be formed, for example, by arm portions which are aligned symmetrically to the longitudinal extension and, resp., to the longitudinal axis of the mounting plate and which form a joint end portion. The symmetric design allows to realize optimum force transmission at the mounting plate.

Another advantage of the extension formed via arm portions results from the fact that a cutout or the like may be provided between the arm portions so as to reduce the weight of the mounting plate and thus of the entire mounting arrangement in this way.

The constructional design of the end portion of the extension can basically be freely chosen when sufficiently safe fixation of the extension is ensured. An especially advantageous configuration is realized in that the joint end portion of the arm portions may be designed to be semi-circular having undercuts or the like provided on both sides. In this manner, the end portion forms a retaining anchor which can be fixed to the mounting tube of the airbag in an efficient as well as reliable manner.

It is further preferred that the mounting plate includes a central opening, especially a screwing bore or clip receiving hole for vehicle-side mounting, wherein preferably retaining claws aligned on both sides next to the central opening transversely to the longitudinal axis of the mounting plate, and further preferably aligned approximately normal to the plate plane, are formed integrally for vehicle-side mounting.

This enables the airbag module to be reliably connected to the vehicle.

The airbag mounted on the vehicle side via the mounting suggested according to the invention preferably is a side airbag, especially a curtain airbag. An independent aspect of the present invention provides an airbag module comprising an airbag, an inflator for providing inflating gas for the airbag and at least one mounting element as afore-described.

Another independent aspect of the present invention is based on providing a vehicle occupant restraint system comprising the claimed mounting element and, resp., comprising the claimed airbag module as well as comprising a sensor unit for detecting circumstances which trigger a case of activation of the inflator, and comprising an electronic computing unit for defining the case of activation based on the circumstances detected by the sensor unit, which will be resulting in the afore-described and further advantages.

Further advantageous and claimed developments will be evident from the subclaims and the description as well as from the drawing.

BRIEF DESCRIPTION OF THE DRAWINGS

Hereinafter, the present invention shall be illustrated in detail by way of the drawings, wherein.

DESCRIPTION

Figure 1:
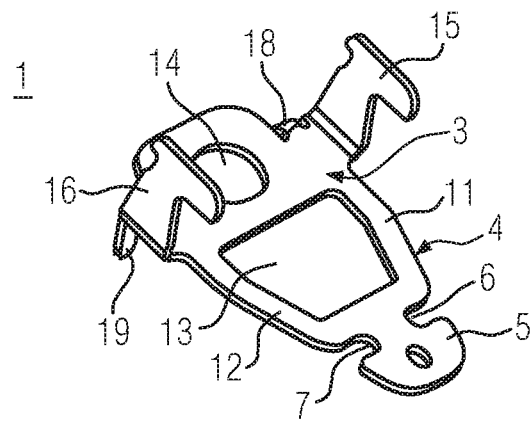
FIG. 1 shows a three-dimensional view of a mounting element according to the invention comprising e.g. a first mounting plate.
Figure 2:
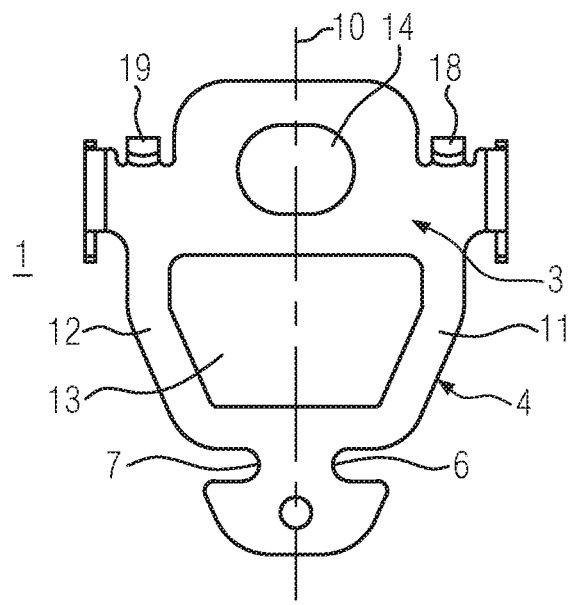
FIG. 2 shows a top view onto the mounting plate according to FIG. 1.
Figure 3:
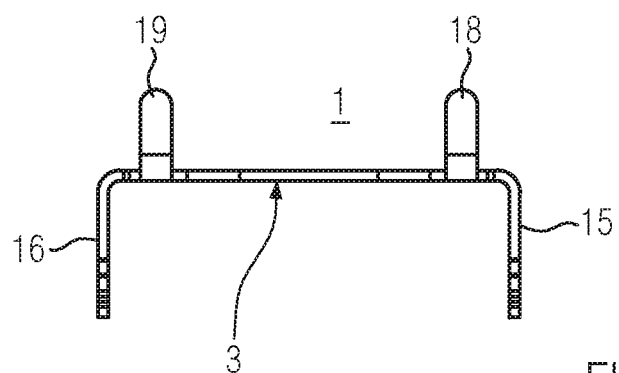
FIG. 3 shows a front view of the mounting plate according to FIGS. 1 and 2.

In FIGS. 1 to 3 different views of a mounting element 1 according to the invention for vehicle-side assembly of at least one retaining tab 21 of an inflatable airbag 2 for a vehicle occupant restraint system are exemplified.

The mounting element 1 is in the form of a mounting plate 3 adapted to be screwed to the vehicle-side. In order to prevent undesired rotation of the airbag 2, especially during initial flow of the inflating gas provided by an inflator into the airbag 2, the mounting plate 3 is provided to have an elongate extension 4 whose end portion 5 can be fixed to the airbag side in the plate plane as an anti-twist protection. The extension 4 comprises two arm portions 11, 12 aligned symmetrically to a longitudinal axis or longitudinal extension 10 of the mounting plate 3, said arm portions jointly forming the end portion 5.

It is evident especially from the FIGS. 1 and 2 that the extension 4 includes, at its end portion 5, two undercuts 6, 7 which can be fixed to a recess 8 of a mounting tube 9 receiving the airbag 2. The two undercuts 6, 7 are arranged symmetrically to the longitudinal axis 10 of the mounting plate 3. The end portion 5 takes a semi-circular shape with the two undercuts 6, 7 provided on both sides. The extension 4 has a weight-reducing cut-out 13 between the arm portions 6, 7.

The mounting plate 3 may have a central screwing bore 14 for vehicle-side mounting. On both sides next to the screwing bore 40 retaining claws 15, 16 aligned transversely to the longitudinal axis 10 approximately perpendicularly to the plate plane are integrally formed for engaging in retaining recesses of the vehicle body for anti-twist protection.

Figure 4:
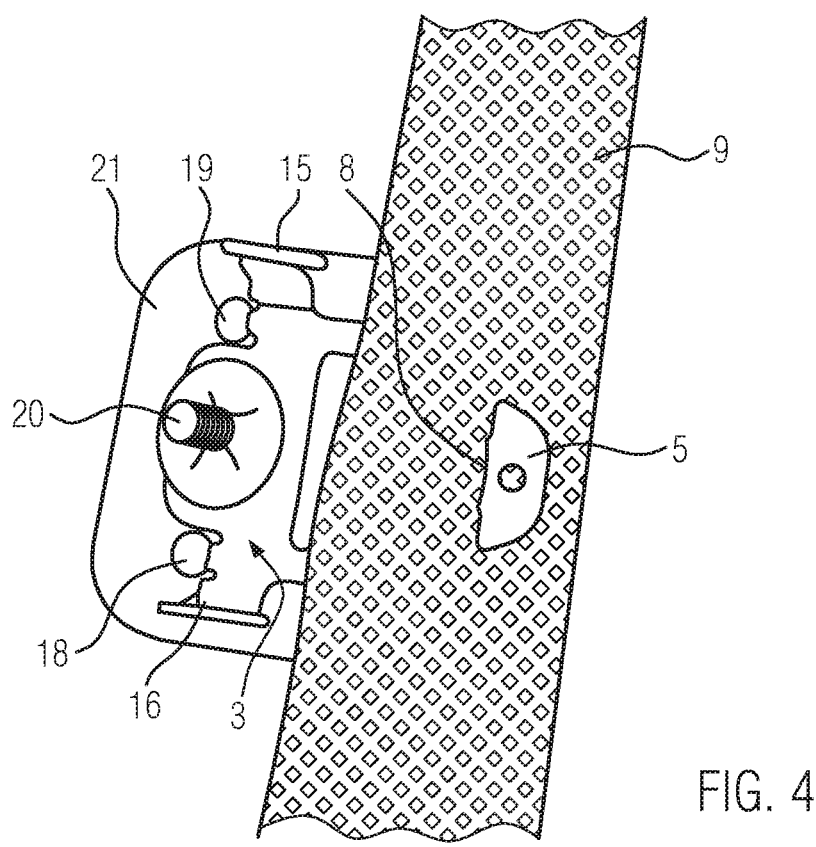
FIG. 4 shows a three-dimensional view of a mounting arrangement according to the invention for vehicle-side assembly of a retaining tab of an airbag present in a mounting tube.
Figure 5:
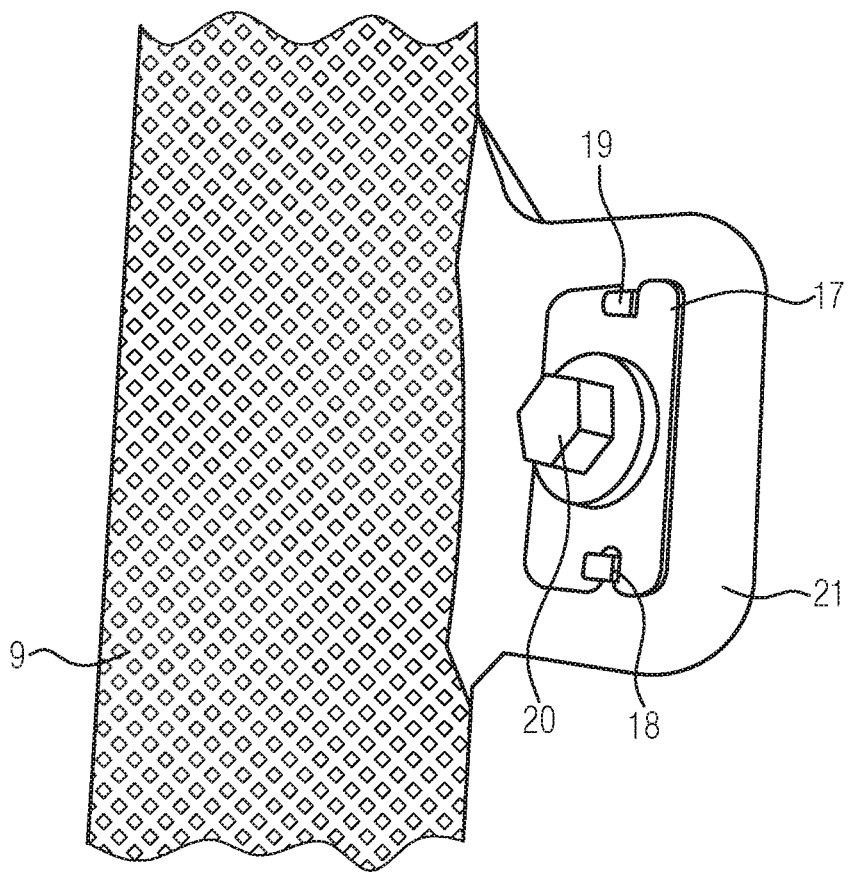
FIG. 5 shows another view of the mounting arrangement according to FIG. 4.
Figure 6:
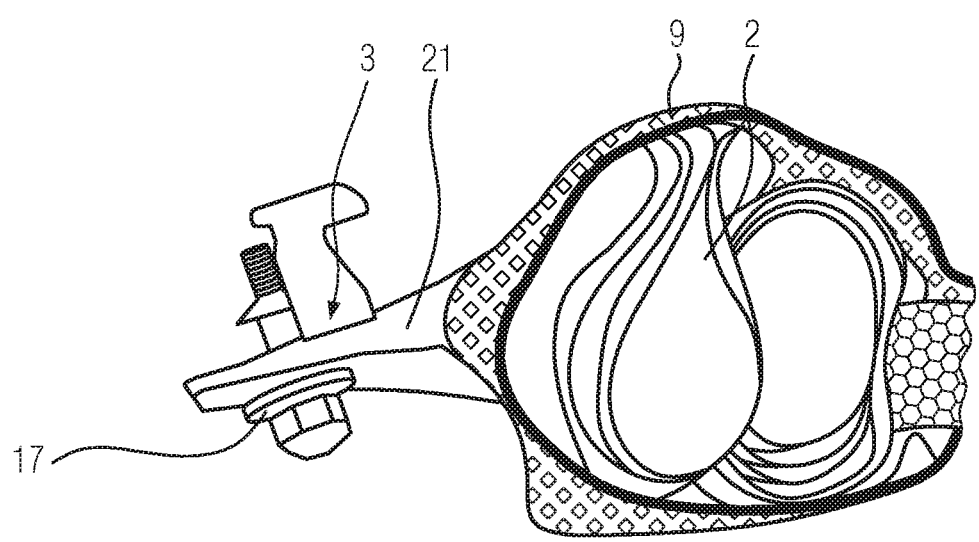
FIG. 6 shows a side view of the mounting arrangement.

In FIGS. 4 to 6, a mounting arrangement comprising the afore-described first mounting plate 3 and comprising at least a second mounting plate 17 as corresponding counter-plate is exemplified. The retaining tab 1 of the airbag 2 rolled-up within the mounting tube is retained between the first mounting plate 3 and the second mounting plate 17. This is especially evident from the side view according to FIG. 6.

The first mounting plate 3 and the second mounting plate 17 are fastened to each other via retaining arms 18, 19 for the purpose of pre-assembly. The retaining arms 18, 19 are arranged on the first mounting plate 3 so that the retaining arms 18, 19 protrude approximately perpendicularly from the first mounting plate 3 in the direction of the second mounting plate 17, which is especially evident also from FIG. 3. For pre-assembly, the retaining arms 18, 19 engage in corresponding fixing recesses of the second mounting plate 17 and after that are appropriately bent.

For vehicle-side assembly of the mounting tube 9 receiving the airbag 2 the mounting arrangement has a joint screw connection 20 by which the retaining tab 1 held between the first mounting plate 3 and the second mounting plate 17 is mounted to the vehicle body preferably above a side window area of the vehicle.

FIGS. 4, 5 and 6 represent the mounting arrangement comprising the airbag 2 rolled up within the mounting tube 9 in different views, with the airbag module comprising, in addition to the mounting arrangement, an inflator for providing inflating gas for the airbag 2 and representing part of the vehicle occupant restraint system.

LIST OF REFERENCE NUMERALS 1 mounting element
2 airbag
3 (first) mounting plate
4 extension
5 end portion
6 undercut
7 undercut
8 recess of mounting tube
9 mounting tube
10 longitudinal axis or, resp., longitudinal extension
11 arm portion
12 arm portion
13 weight-reducing cut-out
14 screwing bore
15 retaining claw
16 retaining claw
17 second mounting plate
18 retaining arm
19 retaining arm
20 screw connection
21 retaining tab
100 airbag module

The invention claimed is:

1. A mounting element for vehicle-side assembly of an airbag module comprising at least one mounting plate adapted to be mounted on the vehicle side which in its plate plane can be non-rotatably coupled to an airbag, wherein the mounting plate includes an extension through which the mounting element can be fixed, perpendicularly to the plate plane, non-rotatably to the airbag or to a retaining element maintaining the airbag in its folded state;

wherein the extension comprises two arm portions which are aligned symmetrically to a longitudinal axis of the mounting plate and which end in a joint end portion of the extension; and wherein the end portion is in the form of a semi-circular retaining anchor, with undercuts provided symmetrically on both sides of the longitudinal axis.

2. The mounting element according to claim 1, wherein the extension has at least one undercut which can be fixed to a recess of the airbag or of the retaining element.

3. The mounting element according to claim 1, wherein the end portion is in the form of a retaining anchor, with undercuts-provided symmetrically on both sides of the longitudinal axis.

4. The mounting element according to claim 1, wherein the extension includes a weight-reducing cut-out between the arm portions.

5. The mounting element according to claim 1, wherein the mounting plate has a central opening for vehicle-side mounting, and wherein retaining claws are formed integrally with the mounting plate for vehicle-side mounting.

6. The mounting element according to claim 1, wherein the airbag is a side airbag.

7. An airbag module comprising an airbag, an inflator for providing inflating gas for the airbag and at least one mounting element according to claim 1.

8. The airbag module according to claim 7, wherein a retaining tab of the airbag is held between the mounting plate of the mounting element and a counter-plate corresponding thereto, and wherein the mounting plate and the counter-plate are coupled to each other.

9. A vehicle occupant restraint system comprising an airbag module according to claim 7 as well as comprising at least one sensor unit for detecting circumstances which trigger a case of activation of the inflator and comprising an electronic computing unit for defining the case of activation based on the circumstances detected by the sensor unit.

10. The mounting element according to claim 5, wherein the central opening comprises one of a screwing bore or clip receiving hole.

11. The mounting element according to claim 5, wherein the retaining claws are aligned on both sides next to the central opening transversely to the longitudinal axis of the mounting plate.

12. The mounting element according to claim 5, wherein the retaining claws are approximately perpendicularly to the plate plane.

13. The airbag module according to claim 8, wherein the first mounting plate and the counter-plate are coupled to each other via retaining arms.

14. The airbag module according to claim 13, wherein the retaining arms comprise portions of the mounting plate configured to extend through the retaining tab of the airbag and crimp onto the counter-plate to sandwich the retaining tab between the mounting plate and the counter-plate.

15. The mounting element according to claim 1, wherein the airbag is a curtain airbag.

16. The mounting element according to claim 1, wherein the mounting plate is configured to overlie an airbag retaining tab and to receive a fastener that extends through the mounting plate and retaining tab to connect the airbag to the vehicle.

17. A mounting element for mounting an airbag module to a vehicle, the mounting element comprising:

a mounting plate configured to overlie a retaining tab that projects from an edge of the airbag and to receive a fastener for connecting the mounting plate and the retaining tab to the vehicle;

an extension that extends from the mounting plate and is configured to be fixed to the airbag or to a mounting tube for the airbag at a location spaced from the retaining tab so that the extension prevents rotation of the airbag in a rolled-up and/or folded state, wherein the extension is configured to extend through an opening in the airbag or retaining element, and wherein the extension comprises at least one undercut portion configured to receive airbag or retaining element material defining an edge of the opening in order to maintain a connection between the extension and the airbag or retaining element.

18. The mounting element according to claim 17, further comprising a counter-plate configured to overlie the mounting plate and to sandwich the retaining tab of the airbag between the mounting plate and the counter-plate, wherein the mounting plate, counter-plate, and retaining tab are configured to receive a fastener for fixing the mounting plate, counter-plate, and retaining tab to the vehicle.

19. The mounting element according to claim 18, further comprising retaining arms configured to extend from the mounting plate through the retaining tab and through corresponding recesses in the counter-plate, the retaining arms being configured to be crimped onto the counter-plate to connect the counter-plate to the mounting plate and to sandwich the retaining tab therebetween.

20. The mounting element according to claim 19, further comprising retaining claws that extend from the mounting plate and are configured to engage corresponding openings in the vehicle to initially mount the airbag module in the vehicle prior to installing the fastener through the assemblage of the mounting plate with the retaining arms crimped onto the counter-plate, sandwiching the airbag retaining tab therebetween.

21. An airbag module comprising an airbag, an inflator for providing inflating gas for the airbag and at least one mounting element, wherein the mounting element comprises at least one mounting plate adapted to be mounted on the vehicle side which in its plate plane can be non-rotatably coupled to an airbag, wherein the mounting plate includes an extension through which the mounting element can be fixed, perpendicularly to the plate plane, non-rotatably to the airbag or to a retaining element maintaining the airbag in its folded state, wherein a retaining tab of the airbag is held between the mounting plate of the mounting element and a counter-plate corresponding thereto, and wherein the mounting plate and the counter-plate are coupled to each other, wherein the first mounting plate and the counter-plate are coupled to each other via retaining arms, wherein the retaining arms comprise portions of the mounting plate configured to extend through the retaining tab of the airbag and crimp onto the counter-plate to sandwich the retaining tab between the mounting plate and the counter-plate.

* * * * *